G. C. DIXON & W. N. HASKELL.
SPEEDOMETER DIAL AND INDICATOR.
APPLICATION FILED NOV. 2, 1916.
1,272,396.
Patented July 16, 1918.
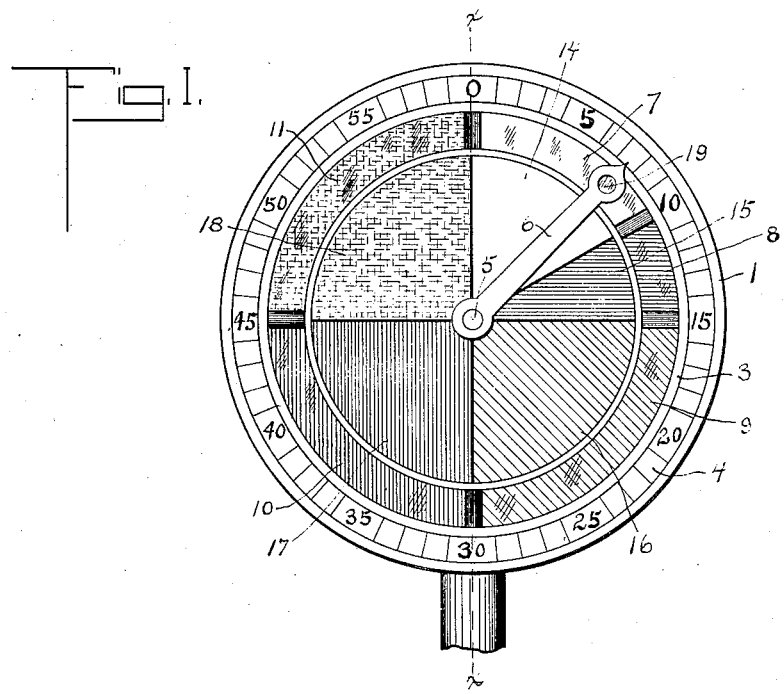
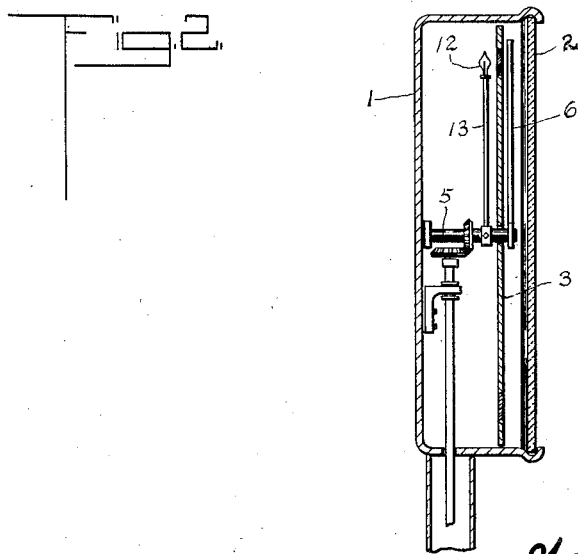

UNITED STATES PATENT OFFICE.

GEORGE C. DIXON, OF DIXON, AND WALTER N. HASKELL, OF STERLING, ILLINOIS.

SPEEDOMETER DIAL AND INDICATOR.

1,272,396.  Specification of Letters Patent.  Patented July 16, 1918.

Application filed November 2, 1916. Serial No. 129,114.

*To all whom it may concern:*

Be it known that we, GEORGE C. DIXON and WALTER N. HASKELL, citizens of the United States, residing at, respectively, Dixon, Lee county, Illinois, and Sterling, in the county of Whiteside and State of Illinois, have invented certain new and useful Improvements in Speedometer Dials and Indicators, of which the following is a specification.

Our invention pertains to speedometer dials and indicators, for use in devices of that class which are employed to show at what rate of speed a motor vehicle is traveling. The present device is designed to be located at some prominent position on the outside of the car, to indicate to others than the occupants thereof at what speed the car is being operated.

Most of the States, and possibly all of them, have passed laws, regulating the rate of speed at which automobiles shall be driven under varying conditions, but these laws are frequently avoided, and prosecutions under them fail, on account of the great difficulty in determining whether or not the speed limit has been exceeded. Drivers of motor propelled vehicles who have a desire to disregard such laws, are more inclined to do so at night-time, when the matter of estimating the speed of the vehicle is still more difficult. With the constantly increasing number of such vehicles throughout the country, a regard for the safety of life and limb of other travelers upon the highways demands that the laws be more rigidly enforced, and that reckless drivers be made to carry with them some means for indicating to others the rate of speed at which they are moving.

Our invention renders it easy to determine, either in the day-time or at night, the number of miles which the car is traveling in an hour, or such other period of time as may be predetermined.

The construction, arrangement and operation of the parts of our machine will more fully appear in the following specification, reference being had to the drawings accompanying the same, in which:

Figure 1 shows our invention, in front elevation. Fig. 2 is a vertical medial section through the casing 1, on the line *x—x* of Fig. 1.

Similar numbers of reference indicate corresponding parts throughout the several figures.

1 represents a cylindrical casing, provided in one end with a glass 2, in rear of which is a dial 3, provided with an annular index 4, divided into markings for the ordinary speed mileage of a motor vehicle. Centrally of the casing 1 is rotatably mounted a shaft 5, to one end of which is fixed an indicating hand or pointer 6, extending outwardly to the index on the face of the dial.

Just within the index 4 the dial is provided with a circle divided into a number of arcs 7, 8, 9, 10 and 11, each of said arcs being formed of colored glass or other transparent material, except the first one, which is clear. In rear of the circle formed of said arcs is a light-bulb 12, carried on an arm 13, fixed to the shaft 5, just in rear of the indicator 6, and adapted to travel therewith at all times on the rotation of the shaft 5. A current of electricity may be furnished to the bulb 12 from the lighting devices of the car, so that the same may be provided with light at any time that the other lights of the car are turned on.

The device is preferably intended to be attached at the rear of a vehicle, and the shaft 5 can be actuated from the drive-shaft of the car, in any known method whereby the speed of such drive-shaft may be imparted to said shaft 5 to cause a proper movement of the hand 6 upon the face of the dial, it not being considered necessary in the present application to show any specific means for accomplishing that result.

The arcs 8, 9, 10 and 11 are formed of various colors, as indicated in the drawings, 8 being blue, 9 green, 10 red, and 11 yellow. The inner field of the dial 3 which is not transparent is divided into sectors 14, 15, 16, 17, and 18, corresponding in position and color to the arcs of the circle, and the hand 6 is of a color contrasting with all of the colors of said field except the first-named, and preferably white. By this means the position of the indicator 6 upon the dial can be discerned at a considerable distance, and to a person somewhat familiar therewith, the position of such indicator would be apparent at a glance. For example, assuming ten miles to be the limit of speed at which a vehicle is permitted to travel in a certain locality, if the indicator were in position over the blue portion of the field it would show at once that the car was being operated at speed somewhere between ten and fifteen miles; on the green field, from fifteen to thirty miles per hour, and if about the center of the green field, somewhere between twenty and twenty-five miles per hour, and so on with the other colors. After dark the illuminated arc would show the position of the indicator and give information of the approximate speed of the vehicle in the same manner. To further aid in indicating the position of the hand 6, the outer end thereof may be provided with an opening 19, just in rear of which is the lamp 12, a spot of color corresponding with that of the arc in rear of which the lamp is positioned being thus presented to the eye. If a red light is visible it shows the car to be traveling between thirty and forty-five miles an hour, and the position of such light on the ninety degree arc 10 would be easily readable, and indicate almost the exact rate of speed to one familiar with the markings on the dial.

As shown in the drawings, there would be no contrast in the color of the hand 6 and that portion of the dial field immediately in rear thereof, and at night only a white light would show in the arc adjacent to such sector of the field, showing the car to be moving at a very moderate rate of speed.

The various colors indicated on the drawings and in the description herein are not arbitrary, but may be varied at will, and changes can be made in the form and arrangement of the several parts and features of the invention without departing from the scope and spirit thereof.

By reason of the entire field of the dial being divided into colored sectors, with surrounding arcs of a similar color, it is possible to use a dial of considerably less diameter than would be the case if a relatively less amount of such dial were provided with such indicating means.

What we claim as our invention, and desire to secure by Letters Patent of the United States, is:

1. In a device of the class named, a dial, provided with a suitable index, and having transparent sections of varying colors adjacent thereto; an indicator operable on the face of said dial; and a lighting device in rear of said transparent sections, and movable with said indicator.

2. A device of the class described, comprising a dial; a plurality of vari-colored transparent sections in the face of said dial; an indicator movable on the face of said dial; and a lighting device in rear of said transparent sections, movable coincidently with said indicator.

3. A device of the class described, comprising a suitably mounted dial; a plurality of vari-colored transparent sections in the face of said dial; a plurality of field sections corresponding in color with said transparent sections; an indicator adapted to traverse said transparent and field sections and contrasting in color therefrom; and a lighting device in rear of said transparent sections, and movable coincidently with said indicator.

4. A device of the class described, comprising a casing, a dial fixed therein and provided with a suitable index; a shaft rotatably mounted centrally of said casing; an indicator fixed to said shaft and operable on the face of said dial; a plurality of vari-colored arcs in the face of said dial; and a lighting device fixed to said shaft and movable in rear of said arcs coincidently with said indicator.

5. A device of the class described, comprising a dial provided with a suitable index; a plurality of vari-colored arcs in the face of said dial; a shaft rotatably mounted centrally of said dial; a lighting device carried by said shaft and movable in rear of said arcs; an indicator fixed to said shaft and movable coincidently with said lighting device; and a plurality of sectors adjacent to said arcs, and corresponding in color therewith, and traversed by said indicator.

6. In a device of the class described, a dial provided with a plurality of vari-colored sections; a lighting device movable in rear of said sections; and an indicator movable in front of said colored sections coincidently with said lighting device, and provided with an opening at a point opposite thereto.

7. A device of the class described, comprising a suitably mounted dial; a plurality of vari-colored transparent sections in the face of said dial; a plurality of field sections corresponding in color with said transparent sections; an indicator adapted to coincidently traverse said transparent and field sections and contrasting in color therefrom; and means for illuminating the rear face of said dial.

In testimony whereof we affix our signatures in the presence of two witnesses.

GEORGE C. DIXON.
WALTER N. HASKELL.

Witnesses:
 RAY T. LUNEY,
 MARK C. KELLER.